United States Patent [19]
Thompson

[11] Patent Number: 5,441,070
[45] Date of Patent: Aug. 15, 1995

[54] FLUID MANAGEMENT SYSTEM

[76] Inventor: Gary E. Thompson, P.O. Box 773222, Steamboat Springs, Colo. 80477

[21] Appl. No.: 149,970

[22] Filed: Nov. 10, 1993

[51] Int. Cl.$^6$ .......................... F17D 3/01; E03B 7/04
[52] U.S. Cl. .................................. 137/1; 137/624.11; 137/552; 137/552.7; 137/557; 137/486; 137/487.5; 137/883
[58] Field of Search ............... 137/486, 487.5, 624.11, 137/861, 883, 87, 551, 552, 557, 1

[56] References Cited

U.S. PATENT DOCUMENTS

| | | |
|---|---|---|
| 2,596,691 | 5/1952 | Jackson . |
| 3,506,033 | 4/1970 | Haney . |
| 4,180,088 | 12/1979 | Mallet . |
| 4,589,435 | 5/1986 | Aldrich ................. 137/624.11 X |
| 4,635,668 | 1/1987 | Netter ................. 137/551 X |
| 4,735,231 | 4/1988 | Jacquet . |
| 5,161,563 | 11/1992 | Thompson ................. 137/1 |

*Primary Examiner*—Martin P. Schwadron
*Assistant Examiner*—Kevin L. Lee
*Attorney, Agent, or Firm*—Brian D. Smith; Sandeep Seth

[57] ABSTRACT

A method and apparatus for managing water consumption and preventing damage to a fluid supply system in a house or structure is disclosed. The water management system includes a water management device coupled between provided fluid flow, pressure, and temperature sensors, and a shut-off valve and a drain valve. The device includes flow control means for opening the shut-off valve when flow is detected at any flow sensor and closing the shut-off valve when flow is undetected. The device also includes flow timers which have a selected operational period for each flow sensor and which close the shut-off valve if the operational period of a flow sensor is exceeded. The device also includes temperature timers for closing the shut-off valve and opening the drain valve when a temperature at or below a minimum temperature is detected by the temperature sensor for a selected maximum temperature detection time period. The device also includes pressure timers for closing the shut-off valve when a pressure at or below a minimum pressure is detected by the pressure sensor for a maximum pressure detection time period, and for periodically opening the shut-off valve to replenish the system when a pressure above a minimum pressure is detected for a minimum pressure detection time period. The device also includes counters to count how many times each flow sensor has detected flow.

22 Claims, 2 Drawing Sheets

FLUID MANAGEMENT SYSTEM

TECHNICAL FIELD OF THE INVENTION

This invention is generally directed to a fluid management system and, more particularly, to fluid management system for monitoring time, pressure, and temperature to prevent fluid flow, particularly water flow, when selected limits are exceeded.

BACKGROUND OF THE INVENTION

Community water providers and planners routinely seek low cost methods and systems for providing water which achieve the needs of the communities they supply. Recently, to counter greater demands for water in areas of increasing population, water providers have begun considering methods and systems which reduce demand. This demand-side approach is proving itself to be less costly than the costs associated with increasing the water supply.

Demand-side water management can also enhance the water quality in areas where ground water withdrawal draws salt water, or pollution from landfills and toxic-waste cites, because it generally reduces the rate of seepage of contaminants into the wells. Surface water quality is also improved by reducing the need for new dams and diversions which add to salinity problems.

As is clear, demand-side management generally reduces water usage benefitting both water suppliers and consumers. A particular benefit of demand-side management is that it reduces potable water usage, both residential and commercial, providing large cost savings. Potable water is particularly costly as its source must be reliable, and it must be treated to potable quality, heated, pumped, and later treated again as waste water.

Therefore, a need exists for more efficient and beneficial demand-side fluid management equipment to reduce water consumption. The fluid management system must also be reliable, easy to use by the consumers, and inexpensive so that it will be accepted by consumers interested in using their resources more wisely and saving money. Such a fluid management system would be even more useful if it prevented water leakage from a broken water line thereby preventing interior damage within a house or building. Therefore, a fluid management system which minimizes water damage resulting from a break in a building's water line, and also monitors water use for overflows, malfunctions, and out of range conditions would more effectively reduce the danger of leakage or breakage and would act as a powerful tool in water management and conservation.

One particular fluid flow control system which lends itself for use in the fluid management system of the present invention is the fluid supply control system disclosed in my U.S. Pat. No. 5,161,563, incorporated herein by reference, which significantly reduces the leakage of water into a home or building when a break in a water line occurs without having to be switched on by the homeowner or building supervisor.

A benefit would be provided by a fluid management system which operates with my fluid control system and utilizes fluid flow sensing information to limit and control fluid flow at the various fixtures of the fluid supply system to protect against overflows and malfunctions. A specific benefit would be provided if the fluid management system provides a water manager with the ability to place definite time limits on the amount of time a fixture or water utilization device is allowed to consume water before the fluid management system automatically closes the main water supply. A further advantage would be provided if the water management system related to a water manager information on the level of usage of each fixture or water utilization device within the supply system.

A further benefit would be provided by a water management system which monitors the supply system for freezing temperatures and automatically shuts down the system and harmlessly drains the portion of the system in danger of freezing to prevent damage to the fluid supply system and resulting damage to the building or structure. A further benefit would be provided if such a system monitors the leakage of the supply system, and either periodically repressurizes the system if the leakage level is acceptable or shuts down the system if the level of leakage becomes unacceptable.

DISCLOSURE OF THE INVENTION

The present invention addresses the aforementioned needs by providing a fluid management system for use with a fluid supply system, as shown in my U.S. Pat. No. 5,161,563, for controlling the flow of fluid from a pressurized source. In its broadest sense, the fluid management system includes a fluid supply system and an apparatus for managing the fluid supply system. The fluid supply system includes a main fluid supply line in fluid communication with a pressurized source of fluid, a plurality of fluid flow control valves, a plurality of branch fluid supply lines in fluid communication with the main supply line and the fluid flow control valves, a main shut-off valve located on the main supply line, and a fluid flow sensor for each of the fluid flow control valves located at or upstream of the fluid control valve for generating or discontinuing the generation of an output signal when flow is sensed.

The apparatus for managing the fluid supply system is coupled between the flow sensors and the main shut-off valve. The apparatus is provided with flow control means responsive to each flow sensor for opening the main shut-off valve when flow is detected by the flow sensor and for closing the main shut-off valve when flow is undetected by the flow sensor. If a break occurs anywhere in the system between the main shut-off valve and the flow sensor, the main shut-off valve will remain closed. Thus, water will not be fed into the leak as would occur in a conventional fluid supply system and the amount of leak damage to the house or structure will be greatly reduced thereby.

The apparatus is further provided with flow timing means responsive to each flow sensor's output signal for timing the period during which the flow sensor senses flow. The flow timing means has a selectable flow sensor operational period for each of the flow sensors and closes the main shut-off valve when the timed period equals the flow sensor operational period for the flow sensor. Each fixture or water utilization device thus has a selected maximum time limit for which its control valve may be opened. For example, a tub may only be allowed to have water flowing into it for up to 15 minutes. If it is unintentionally left on in excess of 15 minutes, the fluid management system will close the main shut-off valve thereby preventing it from overflowing and causing damage. As will be appreciated, this feature also acts as a water conservation tool.

A preferred fluid supply system of the present invention is further provided with both a temperature and a pressure sensor located at a point on said main or one of said branch fluid supply lines for generating or discontinuing the generation of an output signal when a predetermined threshold temperature/pressure or temperature/pressure beyond the threshold is detected. The apparatus is further provided with first signal processing means for controlling the main shut-off valve in response to the generation or discontinuation of an output signal from the temperature and pressure sensors.

The pressure sensor measures the fluid pressure within the main or one of the branch supply lines. The first signal processing means includes first pressure timing means responsive to the pressure sensor output signal and the flow sensor output signal for timing a period during which the pressure sensor detects a pressure at or below the pre-determined threshold pressure and flow is undetected by the flow sensor. The first pressure timing means has a selectable first pressure detection period and closes the main shut-off valve when the period timed equals the first pressure detection period. The first signal processing means further includes second pressure timing means responsive to the pressure sensor output signal and the flow sensor output signal for timing a period during which the pressure sensor detects a pressure above the predetermined pressure and flow is undetected by the flow sensor. The second pressure timing means has a second pressure detection period and opens the main shut-off valve for a selected repressurization period when the period timed equals the second pressure detection period. When the selected pressure is the normal pressure of the system, the system thus prevents feeding the low level leak and compels the water manager to discover the source of the leak in order to prevent the system from automatically repeatedly shutting down. The system also thus periodically replenishes itself to compensate for a small tolerable leak.

In a preferred water management system of the present invention, the temperature sensor has a threshold temperature which is at approximately the freezing point of water. The first signal processing means also includes first temperature timing means responsive to the temperature sensor output signal for timing a period during which the temperature sensor detects a temperature at or below this threshold temperature. The first temperature timing means also has a first selectable temperature detection period and closes the main shut-off valve when the period equals the first temperature detection period.

A preferred water management system of the present invention also is provided with a drain valve located at a point on said main or a said branch fluid supply line downstream of said main shut-off valve and coupled to the apparatus. The apparatus is further provided with second signal processing means for controlling the drain valve. The second signal processing means includes second temperature timing means responsive to the temperature sensor output signal for timing the period during which the temperature sensor detects a temperature at or below the threshold. The second temperature timing means also has a second selectable temperature detection period and opens the drain valve when the period timed equals the second temperature detection period. Preferably, the first and second temperature timing means are one and the same, and the first and second temperature detection periods are equal. In this manner, the management system prevents catastrophic damage to both the supplied structure and the fluid supply system itself which could be caused by bursting pipes if the water within the pipes became frozen. Additionally, the apparatus is provided with warning means for activating a warning signal and third temperature timing means responsive to the temperature sensor output signal for timing the period during which the temperature sensor detects a temperature at or below the threshold. The third temperature timing means has a third selectable temperature detection period, which is less than the first temperature detection period, and activates the warning means when the timed period equals the third temperature detection period. This notifies the water manager that a temperature shutdown may be impending. Since the first and second temperature detection periods are preferably equal, effectively the system has a warning period and a shutdown/drain period.

A preferred embodiment of the present invention also includes counting means responsive to each flow sensor output signal for counting the number of times the flow sensor is activated. Thus, the fluid management system logs each time a water utilization device or fixture is used so a water manager can determine where the heaviest water use occurs and use that information in formulating a water conservation plan.

The present invention also provides a method for managing a fluid supply. The method includes the steps of providing a fluid supply system including a main fluid supply line in fluid communication with a pressurized source of fluid, a plurality of fluid flow control valves, a plurality of branch fluid supply lines in fluid communication with the main supply line and the fluid flow control valves, a main shut-off valve located on the main supply line, a drain valve located downstream of the main shut-off valve at a point on the main or one of the branch fluid supply lines, and a fluid flow sensor, located at or upstream of each fluid control valve, for generating or discontinuing the generation of an output signal when flow is sensed. The method further includes opening the main shut-off valve when flow is detected by the flow sensor and closing the main shut-off valve when flow is undetected by the flow sensor, selecting an operational period for each flow sensor, timing a period a flow sensor senses flow and closing the main shut-off valve when the timed period equals the selected operational period for the flow sensor. The method further includes providing and locating a pressure sensor at a point on the main or one of the branch fluid supply lines for generating or discontinuing the generation of an output signal when a pre-determined threshold pressure or pressure beyond the threshold is detected, selecting a first pressure detection period for the pressure sensor, timing a period during which the pressure sensor detects a pressure at or below the pre-determined threshold pressure and flow is undetected by the flow sensor, and closing the main shut-off valve when the timed period equals the first pressure detection period.

The method further includes providing and locating a temperature sensor at a point on said main or one of said branch fluid supply lines for generating or discontinuing the generation of an output signal when a pre-determined threshold temperature or temperature beyond the threshold is detected, selecting a first temperature detection period for the temperature sensor, timing a period during which the temperature sensor detects a temperature at or below a pre-determined threshold temperature, and closing the main shut-off valve when the timed period equals the first temperature detection period. The method additionally includes opening the drain valve when the timed period equals the first temperature detection period.

BRIEF DESCRIPTION OF THE DRAWINGS

Other features of this invention will appear in the following description and appended claims, reference being made to the accompanying drawings forming a part of the specification where like referenced characters designate corresponding parts of the views.

DETAILED DESCRIPTION OF A PREFERRED EMBODIMENT

Figure 1:
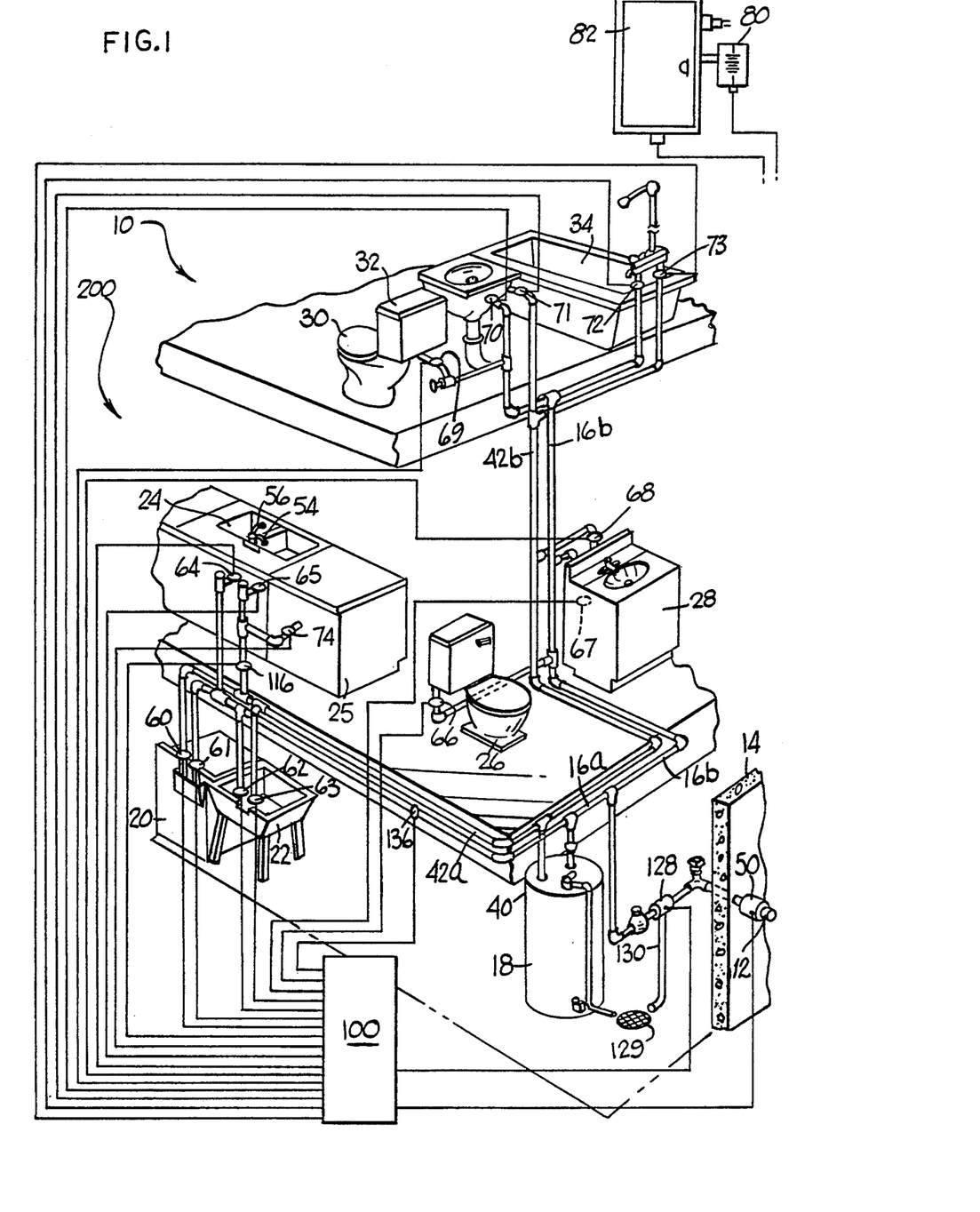
FIG. 1 is a schematic perspective view of a fluid supply system used in conjunction with and as a part of the present invention.

FIG. 1 illustrates a fluid management system 200 of the present invention installed on a water supply system which is similar to that found in many homes today. The water supply system has an incoming main water line 12 which receives water from a source (not numbered) which is typically pressurized. The incoming water line 12 passes through a basement wall 14 of the house to supply water to two branches 16a and 16b of the house's cold water supply line. As illustrated, branch 16a supplies cold water to the building's hot water heater 18, a washing machine 20 located in the basement of the building and a washing basin 22 also located in the basement of the building. In addition, branch 16a supplies cold water to the kitchen sink 24. Similarly, cold water branch 16b supplies cold water to a main floor toilet 26, a main floor bathroom sink 28, an upstairs toilet 30, upstairs sink 32 and upstairs tub/shower 34.

The building's hot water which is heated by hot water heater 18 exits heater 18 through a water line 40 which supplies hot water to two hot water line branches 42a and 42b. Branch 42a supplies hot water to washing machine 20, sink 22, kitchen sink 24 and dishwasher 25. Branch 42b supplies hot water to sink 28, upstairs sink 32 and tub/shower unit 34.

The system described thus far is quite conventional in that it is commonly found in today's buildings and homes. The present invention which can easily be installed on such a system includes an electrically controlled main shut-off valve 50, preferably a solenoid valve, which is installed on the incoming water line 12, preferably on the exterior side of the house's basement wall 14. Main-shut off valve 50 is buried below the soil's surface at a depth which prevents the valve from freezing which depth, of course, will vary from region to region. Shut-off valve 50 is also of the type which is normally closed, thereby preventing water flow into the house unless it is energized to open.

In accordance with an important aspect of the present invention, shut-off valve 50 remains closed (and thus is not energized) until forward fluid flow is sensed by one or more of a plurality of flow sensors 60-74, one of which is located on each hot and cold water line supplying each water utilization device in the house with water i.e. each sink, dishwasher, tub, etc. Quite obviously, water flow at a water utilization device cannot be sensed if the device is not using water i.e. if the flow of water to the device is shut off. For example, water will not flow through a water utilization device such as faucet 54 of kitchen sink 24 until its control valve 56 which controls hot and cold water flow through the faucet is turned on. When, however, control valve 56 is turned on to a position allowing hot water flow, flow sensor 65 (which is installed on the hot water line supplying faucet 54) will sense the flow of hot water to the faucet. The flow sensed by sensor 65 causes the sensor which acts like a switch to complete (or close) an electrical circuit with the shut-off valve, thereby energizing and opening the valve. As such, water flows into the system replenishing that which has left through faucet 54. Valve 50 will remain open as long as flow sensor 65 senses the flow of water which will continue until faucet 54 is shut off.

If a water line should break or begin leaking anywhere between shut-off valve 50 and the control valve of any water utilizing device or fixture in the system, shut-off valve 50 remains closed, thereby preventing water from entering the system and causing damage. Shut-off valve 50 remains closed because water flow cannot be sensed by any of the flow sensors in the system when a break or leaks occurs. Water flow cannot be sensed because it cannot occur when a leak occurs and it cannot occur because the system depressurizes when such a break or leak occurs i.e. if the break is of any appreciable nature.

If there is no leak in the system, water in the system will normally be pressurized. When a water utilizing device is turned on, the pressure causes water to flow through the device. This flow is sensed by the device's respective flow sensor which, as previously described, energizes the shut-off valve, thereby opening valve 50 which permits outside water to flow into the system and replenish that which is leaving the system through the water utilization device.

It will be appreciated that the flow sensors of the present invention only detect fluid flowing towards a water utilization device which is referred to herein as forward fluid flow. The flow sensors should not detect backwards flow (i.e. flow towards the shut-off valve which is the type of water flow which would occur if a break in the system occurred). If backward flow were detectable, the shut-off valve would be energized and open whenever a leak is detected. This is clearly undesirable since the incoming water would simply feed the existing leak or break in the system which could cause extensive damage which is what the present invention is intended to prevent in the first place. Accordingly, it is important that the flow sensors of the present invention only have the capability of detecting forward fluid flow (or at least be capable of distinguishing between forward and backward flow).

The flow sensors of the present invention should also be capable of detecting forward fluid flow at low flow rates. This capability is necessary so that the shut-off valve will open when water is being used at a low rate. If the system were not capable of detecting low flow rates the system would depressurize when water or fluid is drawn from the system at low flow rates. If this were to occur, the entire system would cease functioning since water cannot flow and thus cannot be detected to open the shut-off valve when the system depressurizes (even if a faucet, for example, is turned on full) Accordingly, the flow sensors used on any system in accordance with the present invention should be capable of detecting extremely low (and forward) flow rates, preferably on the order of 0.1 gallons per minute.

A flow sensor which is capable of detecting low flow rates and which has provided good results in a fluid management system which was used to verify the principles of the present invention is the Model FS-4 No. 44714 flow switch manufactured by Gems of Plainville, Conn. The flow switch is a normally open with no flow type. A shut-off valve which was found to provide good results in controlling water flow on the incoming water line of the test system is the model 09-620-32.0200 which is available from Herion, Inc. of Warrendale, Pa.

While not mentioned previously, it is important that the flow sensors be located as close as possible to the water flow control valves of the water utilization devices. In fact, the flow sensors would ideally be located in the water utilization devices and could be possibly be part of the water utilization devices. It is important to keep the flow sensors as close as possible to the water utilization devices' or fixture's control valves so that any breaks or leaks in the system occur upstream from a flow sensor. It will be appreciated that a downstream leak or break in the system might, if significant enough, cause "forward" fluid flow which would be detected by a flow sensor and open the shut-off valve. The opening of the shut-off valve would clearly be undesirable in this situation since it would simply feed water to the leak.

It is also desirable to have a back up battery 80 connected to the system 200 (i.e., the home's fuse box or circuit breaker 82) which can power the system if power to breaker 82 is interrupted.

Figure 2:
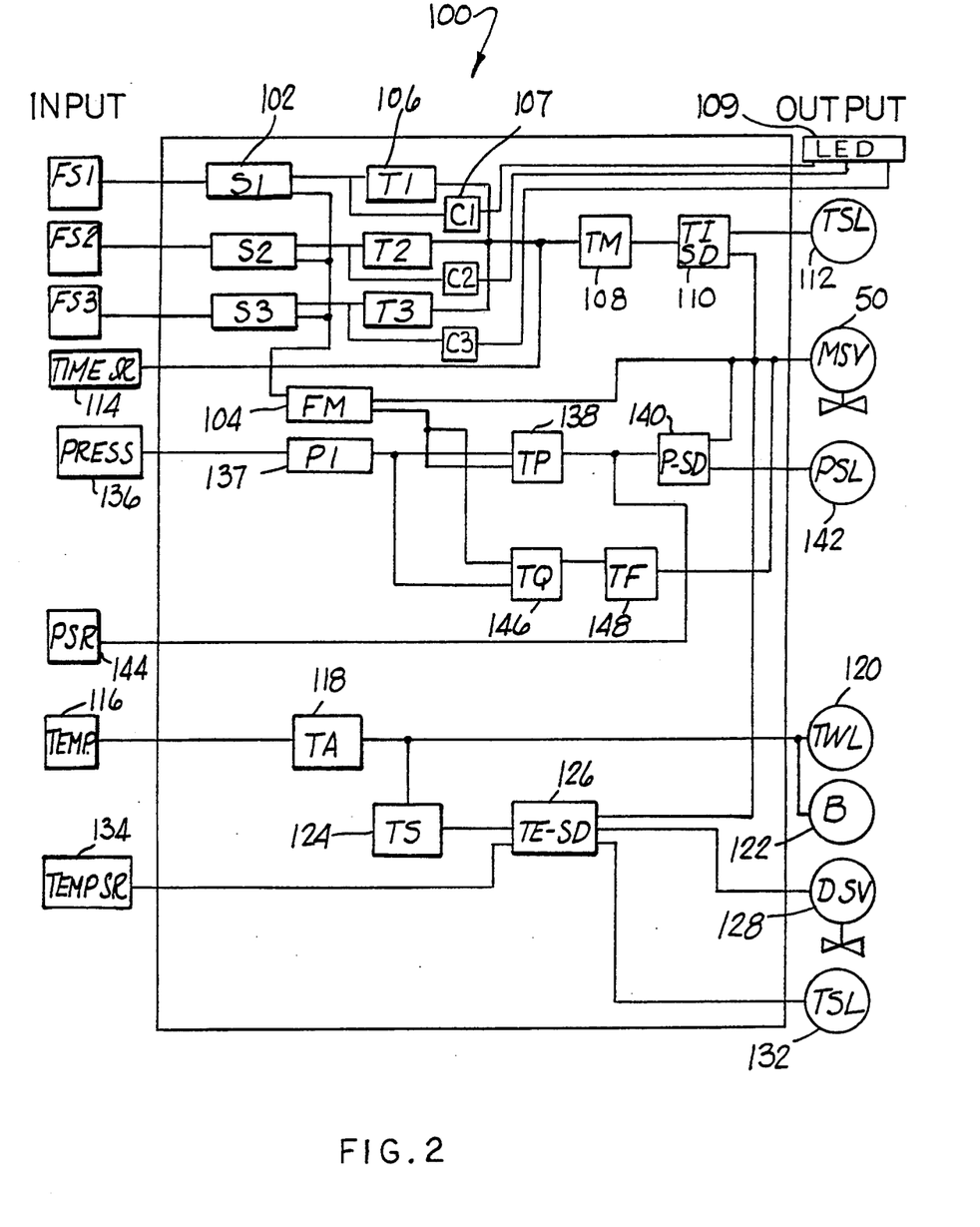
FIG. 2 is a block diagram view showing the fluid management device used with and as a part of the present invention.

As illustrated in FIGS. 1 and 2, a water management device 100 is provided to be used in conjunction with the fluid supply system 10 as part of the fluid management system 200 of the present invention. A suitable computer used to produce a water management device 100 and to test the principles of the present invention is the Model SLC 150 computer manufactured by Allen-Bradley of Milwaukee, Wis. in conjunction with the manufacturer's hand-held programmable controller Model SLC 1745T1. As best seen in FIG. 2, flow sensors 60 through 74 are coupled as inputs to the water management device 100 herein via relay switches 102. The switches 102 are designated as S-1 for flow sensor 1 (FS1), S-2 for flow sensor 2 (FS2), S-3 for flow sensor 3 (FS3), etc. When a control valve of a water utilization device, such as faucet 54 of kitchen sink 24, is turned on to draw water, the flow sensor 65 (designated FS1 for the faucet 54) on the water line supplying faucet 54 will be activated and send a signal to its corresponding relay switch 102 (S1), causing the relay switch 102 (S1) to close. Each relay switch 102 is coupled to a master flow relay switch 104 (designated FM). The output of the master flow relay 102 is coupled to the shut-off valve 50. The switches are configured so that when a (S1) relay switch 102 is closed, three events take place. First, the closing of relay switch 102 (S1) by the activation of flow sensor FS1 will cause the master flow relay 104 (FM) to close and become energized. This, in turn, energizes the shut-off valve 50 to open the valve and allow water to flow into the supply system to replenish that which is left through the faucet 54. When the flow sensor (FS1) is deactivated, as by closing the control valve 56 of the faucet 54, relay switch (S1) opens, thereby opening and de-energize master flow relay switch 104 (FM) to deactivate the shut-off valve 50 and thereby close the valve. As will be appreciated, the (FM) relay acts as part of a flow control means for opening the main-shut off valve when flow is detected by a flow sensor and for closing the main-shut off valve when flow is undetected by the flow sensor.

Second, each relay 102 is also coupled to a first set of timers, or flow timing means, 106 (designated as T1 for relay S1, T2 for relay S2, T3 for relay S3, etc.) programmed within the water management device 100. Suitable timers, for all timing means/purposes specified herein, are programmably provided in the computer specified above. When the S1 relay is energized, corresponding timer T1 is activated and begins timing the length of time flow is occurring at station 1 (faucet 54). When each of the flow sensors 60 through 74 (FS1-FS#) is deactivated when its corresponding water utilization device control valve is shut off, its corresponding relay (S1-S#) will become de-energized and its corresponding timer (T1-T#) is reset to zero.

Each timer 106 (T1-T#) is programmable and may be set for a maximum time count, or flow sensor operational period, using the manufacturer's hand held programmable controller in a manner familiar to those of ordinary skill in the art. In a commercial version of the present invention, the time limits are preferably keyable from the face panel (not shown) of the water management device 100. It will be understood that a single timer may be used if it can properly identify the flow sensor input and store an individual flow sensor operational limit for each flow sensor. The output of each timer T1, T2, T3, etc. is coupled to a common relay 108 (designated TM). When the time count of a timer 106 exceeds the time limit selected for that station (ie., the operational period of that flow sensor), the timer will "time-out" and send a signal to the (TM) relay 108 which closes the (TM) relay. The (TM) relay is coupled to timer shut down relay 110 (designated TI-SD), and, when closed, energizes the timer shut down relay (TI-SD). The output of the timer shut down relay (TI-SD) is coupled to the main shut-off valve 50 and to a time shut down light 112 (designated TSL) on the face panel (not shown) of the water management device 100. When energized, the timer shut down relay (TI-SD) opens the circuit of the main shut-off valve 50 thereby de-energizing and closing the shut-off valve. The (TI-SD) also lights the time shut down light 112. Thus, if a water utilization device is left running for greater than the selected time limit period for that device, the water management system will shut down the water supply system. All of the timers (T1-T#) will reset to zero when the shut-off valve 50 is de-energized and closed by the timer shut down relay (TI-SD), because flow will cease at all the stations and the flow sensors will deactivate.

The timer shut down relay (TI-SD) will remain energized and will maintain the water supply shut-off valve 50 closed until it is de-energized. In a preferred embodiment of the present invention, the timer shut down relay (TI-SD) must be manually de-energized by the timer shut down reset relay 114 (designated TI-SR) on the front panel (not shown) of the water management device 100. The (TI-SR) 114 relay is coupled to the relay (TM) 108. The closing of the (TI-SR) relay causes the relay (TM) to open, thus de-energizing the timer shut down relay (TI-SD) and unlocking the shut-off valve 50 from its closed state. Thus, the shut-off valve can now again be opened if called for by the activation of a flow sensor (FS1-FS#). The system, of course, will have to first be manually re-pressurized for the flow sensor to be able to activate.

When the water control device 100 has shut down the water supply system 10 because a station has "timed-out", the water manager will have to close the control valve of the water utilization device that has been running too long and caused the time-out signal. The front panel (not shown) of the water management device 100 may be provided with individual time shut down lights to specifically indicate the water-utilization device which has timed-out. Otherwise, the water manager may have to tour the various fixtures to see which water utilization device has timed-out and to close the control valve for that device. In either event, this should be done prior to the water manager pressing the timer shut down reset 114 (TI-SD) button because flow will resume at the offending station if its control valve is not first closed and the system has been manually re-pressurized.

Third, the (S1-S#) output signals are coupled and fed to set of counters, or counting means 107 (designated C1-C#) programmably provided within the computer specified above and well known in the art. The counters are responsive to the output signal from each flow sensor and advance each time an output signal is sent by a respective flow sensor. If the flow sensors can be individually identified, it will be appreciated that a single counter with individual memory locations for each flow sensor could be used as counting means 107. In a commercial version of the present invention, the counting means outputs the count to an output LED light 109 on the face panel (not shown) of the water management device 100 in a manner well known in the art. The water manager thus can access water usage information from the device to determine where the heaviest usage is in formulating a water management plan.

A drain solenoid valve 128 is included as an important aspect of the water management system of the present invention. The drain shut-off valve is similar to the main solenoid valve 50, but is of a type which is open in its de-energized state whereas the main solenoid valve is open in its energized state. The drain valve 128 is normally energized, and thus remains closed when there is power to the system. The drain valve 128 is located downstream of the main shut-off valve 50 at a point on the main or a branch supply line which has a hydrostatic head between it and other points on the line, so that water will naturally drain from the drain solenoid valve 128 to a drainage point. If there is a power failure, the drain shut-off valve will become de-energized and the water in the supply system will harmlessly drain to a drainage area 129 through a drainage line 130 in fluid communication with the drain shut-off valve 128. In this manner, water downstream of the shut-off valve 50 need not leak into areas of the house or building supplied by the fluid supply system.

As shown in FIGS. 1 and 2, at least one temperature sensor 116, is provided and mounted at a selected point on the supply system which is readily susceptible to freezing temperatures. The temperature sensor 116 is capable of having a selected threshold temperature programmed in, or may be a thermostat having a selected threshold, or trigger, temperature. In either case, the temperature sensor 116 only sends an output signal when the measured temperature is at, or below, the selected threshold temperature, which is typically approximately 32 degrees Fahrenheit. A suitable temperature sensor was provided in a test system of the present invention by a type E54 Model D21BC (0–150 degrees Fahrenheit range) manufactured by United Electric of Watertown, Mass. As part of a first signal processing means for controlling the main-shut of valve, the output signal from the temperature sensor 116 is received by a temperature timer, or timing means, 118 (designated TA) and activates the timer to begin timing. The (TA) timer 118 is programmed to "time out" after a selected temperature detection period, such as 15 minutes. If the temperature sensed by the temperature sensor 116 goes above the threshold temperature, the output signal from the sensor 116 discontinues and timer 118 (TA) resets to zero. If, however, the senses temperature stays at or below the threshold temperature continuously over the selected temperature detection period, the timer 118 (TA) "time-outs" and sends an output signal. The output of timer (TA) is coupled to a temperature warning light 120 on the control panel (not shown) of the device 100 and an alarm, or warning means, 122, both of which are activated by the (TA) output signal. The output of the timer 118 (TA) is also coupled to a temperature timer 124 (designated TS), which begins timing when it receives the (TA) output signal. If the temperature sensed by sensor 116 goes above the threshold temperature, the timer 118 (TA) output discontinues and timer 124 (TS) resets. Timer 124 (TS) also has a programmable time limit, or temperature detection period, such as 15 minutes, and is coupled to a temperature shut down relay 126 (designated TE-SD). The temperature shut down relay 126 (TE-SD) is normally closed and energized. The (TE-SD) relay output is coupled to drain valve 128, the main shut-off valve 50, and a temperature shut down light 132. When timer 124 (TS) times out, its output signal causes the temperature shut down relay 126 (TE-SD) to de-energize. De-energizing the temperature shut down relay 126 (TE-SD) causes the drain shut-off valve 128 to be de-energized, and therefore open, to drain the system. The de-energizing of the temperature shut down relay 126 (TE-SD) also causes the supply shut-off valve 50 to be de-energized and therefore closed to shut-off the supply system. Also, de-energizing of the 126 (TE-SD) relay causes the temperature shut down light 132 to be illuminated.

A temperature shut down reset button 134 (designated TE-SR) on the front panel (not shown) of the water management device 100 is coupled to relay 126 (TE-SD). When the reset button 134 is closed, the (TE-SR) output signal switches the temperature shut down relay 126 (TE-SD) from its de-energized position back to its energized position. In this manner, when it is safe to do so, the water manager can allow the main water supply shut-off valve 50 to be in a state to re-open responsive to a flow sensor, and close the drain shut-off valve 128. After the system has been manually re-pressurized, the system can begin operating again.

In accordance with another important aspect of the present invention, the water management system 100 is also provided with the capability to monitor for pressure leaks and shut-down the supply system in the event of leak. At least one pressure sensor 136 is provided and located at a point along the main or one of the branch supply lines to measure the fluid pressure within the line at that point. A suitable pressure sensor 136 is provided by a Type H54S Model 25 pressure switch manufactured by United Electric of Watertown, Mass., and has a variable selectable threshold pressure between 10–100 psi. When the pressure detected at the sensor is at or below the selected threshold pressure, the pressure switch 136 closes and sends an output signal. The pressure sensor 136 (via relay switch 137 (designated P1)) and the internal master flow relay 104 (FM) are coupled to a pressure timer, or pressure timing means 138 (designated TP). When the measured pressure is higher than the threshold pressure, the pressure sensor 136 remains open and generates no output signal. When the system pressure is below the threshold pressure, the pressure sensor 136 sends an output signal to timer 138 (TP). If, additionally, no output signal is generated from master flow relay 104 by the activation of a flow sensor, the timer 138 becomes activated and begins timing. Therefore, the timer (TP) only counts the time duration for which there is simultaneously no flow detected at any of the stations and the water pressure in the system is below the threshold. The timer 138 (TP) has a selectable pressure detection period and generates a time out signal when that time limit is exceeded. This pressure detection period will be selected at the discretion of the water manager and may only be large enough to filter out the shortest temporary low pressure states in the system, such as when multiple water utilization devices or fixtures are being used simultaneously, or may be shorter than that depending on the goals of the water manager. The timer 138 output is coupled to a pressure shut down relay 140 (P-SD) and activates the relay when it time outs. The pressure shut down relay 140 (P-SD) output is coupled to the main shut-off valve and a pressure shut down light 142 on the panel (not shown). When the pressure shut down relay 140 (P-SD) is energized by the timing out of timer 138 (TP), three events take place. First, the main water supply shut-off 50 is de-energized and thus closed. Second, the pressure shut down light 142 on the panel (not shown) is activated to notify the water manager that a pressure shut down has occurred. Third, the shut down relay 142 locks itself in. It is important to note that the shut-down of the system from time or temperature, as described above, could also result in a pressure shut-down and lock-out as just detailed. For example, the pressure sensor will detect low pressure if the system has been drained by detecting low temperature for a sufficient period, or if the main-solenoid valve has been closed by a flow sensor "timing out" and the control valve to the "timed out" sensor has not been closed.

A pressure shutdown reset relay 144 (designated PSR) on the panel (not shown) is coupled to the (P-SD) relay. When closed, the (PSR) relay switches the (P-SD) relay to a de-energized state, thus causing the main shut-off valve 50 to enter into a neutral state ready to open and repressurize the system if energized by the activation of a flow sensor. The system will first have to be manually re-pressurized so that flow past a flow sensor can activate the sensor and, in turn, open the main shut-off valve 50. Of course, the system will quickly shut down again by the pressure shut down relay 140 (P-SD) if the system pressure does not quickly come back up above the trigger pressure.

As an optional feature controllable from the face panel (not shown) of water management device 100, is a small leak compensator which keeps the system pressurized when the leak is within a specified tolerance is provided. A small leak timer, or pressure timing means, 146 (designated TQ) is coupled to the master flow relay 104 (FM) and the pressure input relay 137 (P1). The timer (TQ) continuously times while the system is simultaneously in a quiescent state, i.e. when the flow sensors are not sensing flow (resulting in no output signal from the master flow relay (FM) and the measured pressure of the system is above the threshold pressure (no output signal sent from the pressure sensor 136 via relay (P1)). The timer 146 (TQ) can be set for a selectable pressure detection period which may be approximately 10 minutes. The (TQ) timer will time up to the limit unless it is reset to zero by an output signal from either the (FM) or (P1) relay. In the event that no output signal is received by timer (TQ) from the (FM) or (P1) relay during the selected pressure detection period, the timer (TQ) "time outs" at the end of the selected pressure detection period and outputs a signal to activate a timer 148 (TF). This timer 148 (TF) has a selectable repressurization time period for which it times when activated. For example, the timer may be activated for a two second repressurization period. During the repressurization period, the timer (TF) sends an output signal to main shut-off valve 50 to open the main shut-off valve 50 so that it may replenish the system. Both timers (TQ) and (TF) are programmed to reset when they send their respective output signals. Alternatively, while not show, the output from timer (TF) may also be coupled back to timer (TQ) to reset the timer (TQ) and time (TF) may itself be reset by receiving the output signal from timer (TQ). In this manner, the water supply system may be allowed to periodically automatically repressurize itself as long as its inherent or natural leak rate is below a specified leak rate limit.

From the foregoing, it will be appreciated that a fluid management system is provided which acts as water conservation tool, and which shuts down the fluid supply system to prevents leakage and loss when a fixture or water utilization device has been left running for too long. It will further be appreciated that the management system will tell the water manager where the most frequent, and hence heaviest, water usage is taking place. It will further be appreciated that the water management system will also shut-off the supply system if the supply system has been experiencing freezing or near freezing temperatures for too long of a time and is in danger of rupturing. It will further be appreciated that the management system will also drain the supply system when the aforementioned temperature state exists to prevent the supply system from rupturing. It will further be appreciated that management system will shut-off the supply system if there has been unacceptable de-pressurization in the system. It will further be appreciated that the management system will periodically replenish the supply system when the system is not leaking or is leaking within tolerance.

While the above invention has been shown and described in detail in this application, it should be understood that this invention is not to be limited to the exact form disclosed and changes in detail and construction of the invention may be made without departing from the spirit thereof.

I claim:

1. An apparatus for managing a fluid supply system, the fluid supply system having a main fluid supply line in fluid communication with a pressurized source of fluid, a plurality of fluid flow control valves, a plurality of branch fluid supply lines in fluid communication with the main supply line and the fluid flow control valves, a main shut off valve on the main supply line, a drain valve downstream of the main shut-off valve on the main or one of the branch fluid supply lines, a fluid flow sensor located at or upstream of each fluid flow control valve for generating an output signal when flow is detected, and at least one temperature/pressure sensor located at a point on the main or one of the branch fluid supply lines for generating an output signal when a pre-determined threshold temperature/pressure or temperature/pressure beyond the threshold is detected, said apparatus comprising:

flow control means responsive to a flow sensor output signal for opening the main shut off valve when flow is detected by the flow sensor and for closing said main shut-off valve when flow is undetected by the flow sensor;

flow timing means responsive to a flow sensor output signal for timing a period during which the flow sensor detects flow, said flow timing means also having a selectable flow sensor operational period, and closing the main shut-off valve when the timed period equals the flow sensor operational period; and first signal processing means for controlling the main shut-off valve in response to the generation or discontinuation of an output signal from a said temperature/pressure sensor.

2. An apparatus as claimed in claim 1 wherein:
a said temperature/pressure sensor is a temperature sensor; and
said first signal processing means includes first temperature timing means responsive to a temperature sensor output signal for timing a period during which the temperature sensor detects a temperature at or below a pre-determined threshold temperature, said first temperature timing means also having a first selectable temperature detection period, and closing the main shut-off valve when the timed period equals the first temperature detection period so that the fluid supply system shuts down when it is in danger of freezing.

3. An apparatus, as claimed in claim 2, further including:
second signal processing means for controlling the drain valve in response to the generation or discontinuation of an output signal from the temperature sensor.

4. An apparatus, as claimed in claim 3, wherein:
said second signal processing means includes second temperature timing means responsive to a temperature sensor output signal for timing the period during which the temperature sensor detects a temperature at or below a pre-determined threshold temperature, said second temperature timing means also having a second selectable temperature detection period, and opening the drain valve when the timed period equals the second temperature detection period so that the fluid supply system drains when it is in danger of freezing.

5. An apparatus, as claimed in claim 4, wherein:
said first timing means is also said second temperature timing means, and the first and second temperature detection periods are equal.

6. An apparatus, as claimed in claim 2, said apparatus further including:
warning means for activating a warning signal; and
third temperature timing means responsive to a temperature sensor output signal for timing the period during which the temperature sensor detects a temperature at or below a pre-determined threshold temperature, said third temperature timing means also having a third selectable temperature detection period which is less than the first temperature detection period, and activating said warning means when the timed period equals the third temperature detection period, to provide a warning signal which indicates that the fluid supply system is in danger of freezing.

7. An apparatus as claimed in claim 1 wherein:
said temperature/pressure sensor is a pressure sensor for measuring fluid pressure within the main or one of the branch supply lines; and
said first signal processing means includes first pressure timing means responsive to the pressure sensor output signal and the flow sensor output signal for timing a period during which the pressure sensor detects a pressure at or below the pre-determined threshold pressure and flow is undetected by the flow sensor, said first pressure timing means also having a selectable first pressure detection period, and closing the main shut-off valve when the timed period equals the first pressure detection period, so that the fluid supply system is shut down when the pressure detected by the pressure sensor is at or below the threshold pressure as when the system is leaking.

8. An apparatus, as claimed in claim 7, wherein:
said first signal processing means further includes second pressure timing means responsive to a pressure sensor output signal and a flow sensor output signal for timing a period during which the pressure sensor detects a pressure above the pre-determined pressure and flow is undetected by the flow sensor, said second pressure timing means also having a second pressure detection period, and opening the main shut-off valve for a selectable repressurization period when the timed period equals the second pressure detection period, so that the fluid supply system is periodically re-pressurized when the pressure detected by the pressure sensor is above the threshold pressure as when the system is working normally.

9. An apparatus, as claimed in claim 1, further comprising:
counting means responsive to a flow sensor output signal for counting the number of times the flow sensor is activated.

10. A fluid management system comprising:
a fluid supply system including
a main fluid supply line in fluid communication with a pressurized source of fluid,
a plurality of fluid flow control valves,
a plurality of branch fluid supply lines in fluid communication with said main supply line and said fluid flow control valves, and
a main shut-off valve located on said main supply line;
a fluid flow sensor for each said fluid flow control valve located at or upstream of said fluid control valve for generating or discontinuing the generation of an output signal when flow is sensed; and
an apparatus for managing said fluid supply system coupled between said flow sensors and said main shut-off valve, said apparatus including
flow control means responsive to each said flow sensor for opening said main shut-off valve when flow is detected by a said flow sensor and for closing said main shut-off valve when flow is undetected by said flow sensor, and
flow timing means responsive to each said flow sensor output signal for timing the period during which the flow sensor senses flow, said flow timing means also having a selectable flow sensor operational period for each of said flow sensors, and closing said main shutoff valve when the timed period equals the flow sensor operational period for the flow sensor.

11. A fluid management system, as claimed in claim 10, further comprising:
at least one temperature/pressure sensor located at a point on said main or one of said branch fluid supply lines for generating or discontinuing the generation of an output signal when a pre-determined threshold temperature/pressure or temperature/pressure beyond the threshold is detected; and
first signal processing means for controlling the main shut-off valve in response to the generation or discontinuation of an output signal from a temperature/pressure sensor.

12. A fluid management system, as claimed in claim 11, wherein:
said temperature/pressure sensor is a pressure sensor for measuring fluid pressure within said main or a said branch supply line; and
said first signal processing means includes first pressure timing means responsive to the pressure sensor output signal and the flow sensor output signal for timing a period during which the pressure sensor detects a pressure at or below the pre-determined threshold pressure and flow is undetected by the flow sensor, said first pressure timing means also having a selectable first pressure detection period, and closing the main shut-off valve when the timed period equals the first pressure detection period, so that the fluid supply system is shut down when the pressure detected by the pressure sensor is at or below the threshold pressure as when the system is leaking.

13. A fluid management system, as claimed in claim 12, wherein:
said first signal processing means further includes second pressure timing means responsive to a pressure sensor output signal and a flow sensor output signal for timing a period during which the pressure sensor detects a pressure above the pre-determined pressure and flow is undetected by the flow sensor, said second pressure timing means also having a second pressure detection period, and opening the main shut-off valve for a selectable repressurization period when the timed period equals the second pressure detection period, so that the fluid supply system is periodically re-pressurized when the pressure detected by the pressure sensor is above the threshold pressure as when the system is working normally.

14. A fluid management system, as claimed in claim 11, wherein:
said temperature/pressure sensor is a temperature sensor; and
said first signal processing means includes first temperature timing means responsive to a temperature sensor output signal for timing a period during which the temperature sensor detects a temperature at or below a pre-determined threshold temperature, said first temperature timing means also having a first selectable temperature detection period, and closing the main shut-off valve when the timed period equals the first temperature detection period, so that the fluid supply system shuts down when it is in danger of freezing.

15. A fluid management system, as claimed in claim 14 further including:
a drain valve located at a point on said main or a said branch fluid supply line downstream of said main shut-off valve and coupled to said apparatus; and
second signal processing means for controlling said drain valve, said second signal processing means including second temperature timing means responsive to a temperature sensor output signal for timing the period during which the temperature sensor detects a temperature at or below a pre-determined threshold temperature, said second temperature timing means also having a second selectable temperature detection period, and opening said drain valve when the timed period equals the second temperature detection period, so that the fluid supply system drains when it is in danger of freezing.

16. A fluid management system as claimed in claim 14, further including:
warning means for activating a warning signal; and
third temperature timing means responsive to a temperature sensor output signal for timing the period during which the temperature sensor detects a temperature at or below a pre-determined threshold temperature, said third temperature timing means also having a third selectable temperature detection period which is less than the first temperature detection period, and activating said warning means when the timed period equals the third temperature detection period, to provide a warning signal which indicates that the fluid supply system is in danger of freezing.

17. A fluid management system as claimed in claim 10, further including:
counting means responsive to a said flow sensor output signal for counting the number of times said flow sensor is activated.

18. A method for managing a fluid supply comprising the steps of:
providing a fluid supply system including
a main fluid supply line in fluid communication with a pressurized source of fluid,
a plurality of fluid flow control valves,
a plurality of branch fluid supply lines in fluid communication with the main supply line and the fluid flow control valves,
a main shut-off valve located on the main supply line,
a drain valve located downstream of the main shut-off valve at a point on the main or one of the branch fluid supply lines, and
a fluid flow sensor, located at or upstream of each fluid control valve, for generating or discontinuing the generation of an output signal when flow is sensed; opening the main shut-off valve when flow is detected by the flow sensor and closing the main shut-off valve when flow is undetected by the flow sensor;
selecting an operational period for each flow sensor;
timing a period a flow sensor senses flow; and
closing the main shut-off valve when the timed period equals the selected operational period for the flow sensor.

19. A method, as claimed in claim 18, further including the steps of:

providing and locating a pressure sensor at a point on the main or one of the branch fluid supply lines for generating or discontinuing the generation of an output signal when a pre-determined threshold pressure or pressure beyond the threshold is detected;

selecting a first pressure detection period for the pressure sensor;

timing a period during which the pressure sensor detects a pressure at or below the pre-determined threshold pressure and flow is undetected by the flow sensor; and closing the main shut-off valve when the timed period equals the first pressure detection period, to shut down the supply system when the pressure detected by the pressure sensor is at or below the threshold pressure as when the system is leaking.

20. A method, as claimed in claim 19, further including the steps of:

selecting a second pressure detection period for the pressure sensor;

timing a period during which the pressure sensor detects a pressure above the pre-determined pressure and flow is undetected by the flow sensor; and opening the main shut-off valve for a selectable re-pressurization period when the timed period equals the second pressure detection period, to periodically re-pressurize the supply system when the pressure detected by the pressure sensor is above the threshold pressure as when the system is working normally.

21. A method, as claimed in claim 18, further including the steps of:

providing and locating a temperature sensor at a point on said main or one of said branch fluid supply lines for generating or discontinuing the generation of an output signal when a pre-determined threshold temperature or temperature beyond the threshold is detected;

selecting a first temperature detection period for the temperature sensor;

timing a period during which the temperature sensor detects a temperature at or below a predetermined threshold temperature; and closing the main shut-off valve when the timed period equals the first temperature detection period, to shut-down the fluid supply system shuts when it is in danger of freezing.

22. A method, as claimed in claim 21, further including the steps of:

selecting a second temperature detection period for the temperature sensor;

timing the period during which the temperature sensor detects a temperature at or below a predetermined threshold temperature; and opening the drain valve when the timed period equals the second temperature detection period, to drain the fluid supply system when it is in danger of freezing.

* * * * *